United States Patent
Colburn

(10) Patent No.: US 6,310,325 B1
(45) Date of Patent: Oct. 30, 2001

(54) STEAMER OVEN WITH CONTROLLED CONDENSING OF STEAM

(75) Inventor: Michael G. Colburn, Shelburne, VT (US)

(73) Assignee: Colburn Treat, LLC., Winooski, VT (US)

( * ) Notice: Subject to any disclaimer, the term of this patent is extended or adjusted under 35 U.S.C. 154(b) by 0 days.

(21) Appl. No.: 09/025,703

(22) Filed: Feb. 18, 1998

(51) Int. Cl.[7] ........................................... A47J 27/16
(52) U.S. Cl. ..................... 219/401; 219/411; 219/438; 99/339; 392/416
(58) Field of Search ........................... 219/401, 411, 219/400, 438, 439, 440, 441, 442, 478, 479, 480, 476, 477; 126/20, 20.1, 50.2, 369; 422/11, 26; 392/403, 405, 406

(56) References Cited

U.S. PATENT DOCUMENTS

| | | | |
|---|---|---|---|
| 2,621,616 | * 12/1952 | Ames | 99/339 |
| 2,715,898 | * 8/1955 | Michaelis et al. | 219/401 |
| 3,769,902 | * 11/1973 | Hurwitz | 99/472 |
| 3,800,778 | * 4/1974 | Lohr et al. | 99/468 |
| 4,430,557 | 2/1984 | Eichelberger et al. | |
| 4,495,932 | 1/1985 | Bratton. | |
| 4,655,192 | * 4/1987 | Jovanovic | 219/401 |
| 4,810,856 | 3/1989 | Jovanovic. | |
| 4,839,502 | 6/1989 | Swanson et al. | |
| 5,057,332 | 10/1991 | Davidson et al. | |
| 5,235,903 | 8/1993 | Tippmann. | |
| 5,318,792 | 6/1994 | Tippmann. | |
| 5,363,748 | 11/1994 | Boehm et al. | |
| 5,411,753 | 5/1995 | Tippmann. | |

FOREIGN PATENT DOCUMENTS

| | | |
|---|---|---|
| 1383560 | * 2/1975 | (GB). |
| 2010078 | * 6/1979 | (GB). |
| 3-182215 | * 8/1991 | (JP). |
| 3-262469 | * 11/1991 | (JP). |

* cited by examiner

Primary Examiner—John A. Jeffery
(74) Attorney, Agent, or Firm—Donald C. Casdy, Esq.

(57) ABSTRACT

A hollow pressure cooking vessel comprises a bottom, a top and sides. A steam reservoir is provided in the bottom and radiant heaters are provided in the top. The interior of the top is a dome or has sloped sides and radiant heaters are spaced externally to the top. Food to be cooked is located on a tray disposed between the dome and the base. An optional vacuum pump is provided to evacuate the interior of the vessel and heaters are provided to heat the entire vessel to generate steam from the reservoir while maintaining the sides and the temperature above the cooking temperature of the food to be cooked within the vessel.

11 Claims, 5 Drawing Sheets

STEAMER OVEN WITH CONTROLLED CONDENSING OF STEAM

FIELD OF THE INVENTION

This invention relates to a multiple function steamer and cooker oven which can cook with atmospheric steam or steam under pressure, without a separate steam generator; cook with supplemental radiant heating to enhance cooking capabilities, superheated steam, or cook without steam. As an improved feature a vacuum can be drawn within the cooking chamber to provide vacuum marination of food and subatmospheric pressure steam cooking in combination with the above cooking processes.

DESCRIPTION OF THE PRIOR ART

Combination steamer and convection ovens are well known and have been in use both commercially and to some extent domestically for many years. In addition, as is well known to those skilled in the art, cookers are available which utilize steam under pressure, or atmospheric steam. In these commercial cookers the steam is often generated in a separate steam generator and piped into the cooking vessel. While domestic and commercial pressure cookers have been in use for several years, generation of steam within the cooking chamber under pressure or at atmospheric pressure, on a commercial scale, is not available.

In cooking with steam, steam condenses on the cooler food product releasing the eat of condensation to cook the food. In conventional units the steam also condenses on he walls of the cooker and on the cooler cooking pan so that the cooking procedure is relatively inefficient. Heat of condensation then is lost to condensation on non-food structural portions of the conventional steamer oven.

It is also known that steam cooking will not caramelize or brown the outer surface of the food being cooked, and therefore in certain products it is necessary to supplement the steam with a resistance heater.

For example, in U.S. Pat. No. 4,839,502, there is described a cooker which uses steam, but also includes a black body used to emit what is described as long wave length radiation and to absorb short wave length radiation. The black body is said to initially absorb both short wave and long wave length radiation and reradiate only the long range wave length radiation to cook the foodstuff. This is described as necessary to take advantage of the penetrating ability of long wave length radiation. The patent required the use of long wave length over short wave length for cooking purposes.

In that patent there also is a teaching for stopping steam generation when the internal temperature of the foodstuff reaches a desired level and using external air to remove moisture by evaporation from the foodstuff. Further cooking is then achieved without steam to brown the product with what is described as long wave radiation which allows moisture within the foodstuff to move to the surface and evaporate.

However, contrary to the teachings of this patent short range radiation (0.76–2 um) has greater penetrating ability than medium (2–4 um) and medium range radiation has greater penetration than for long range (4–10 um ) radiation. Water in food is most susceptible to radiation at 3 um and at 6 um where 100% absorption is exhibited. The burning or browning of meat and other foods is due to short range radiation.

In terms of temperature, at 212 degrees Fahrenheit surface temperature, the I.R. peak wave length is 7.8 um with a total radiated energy from a black anodized aluminum surface of 887 Watts/sq, meter. At 350 degrees Fahrenheit surface temperature the wave length is 6.4 um with a total radiated energy of 1896 Watts/sq. meter.

The engineering data available then does not support a preference for long wave radiation for cooking purposes.

In U.S. Pat. No. 4,495,932, there is described a steamer which uses super heated steam. The device uses a first chamber to generate the steam and a second chamber to super heat the steam. The steam then flows from the chamber onto the food. The patent however does not describe a radiant heating function for the product.

Other steaming devices are described for example in U.S. Pat. Nos. 5,363,748; 4,810,856; 4,655,192; 4,430,557; 5,411,753; 5,235,903; and 5,318,792.

In U.S. Pat. No. 5,507,332, there is described an apparatus for marinating meat using a vacuum induced within the unit to facilitate the marinating process. This patent however does not describe a cooking function but is limited to the description of a pressure vessel used to vacuum marinate at room temperature.

SUMMARY OF THE INVENTION

It has been discovered however that a superior cooking device can be provided that combines the functions of marinating, steam cooking, and radiant cooking, alone, in combination, at atmospheric pressure, reduced pressure, or at an elevated pressure.

According to the device of this invention the steam chamber is manufactured from a highly conductive metal such as cast aluminum wherein the sides, base and upper portion are all cast with circumferential ribs extending outwardly from the outer surface to facilitate the structural integrity of the device. The steam chamber may have a separate decorative outer enclosure as will be subsequently described.

Steam then is generated in the base of the chamber, preferably by resistance heaters embedded in the base and ceiling of the unit or attached to the structure external to the chamber so that the interior of the chamber is heated externally by heating the surrounding walls, ceiling and base by conduction. In this manner the walls of the structure are typically maintained at a temperature higher than the cooking temperature of the food product.

By heating the walls, steam generated will condense on the food product and food containers rather than on the walls of the structure to maximize the heat of condensation delivered to the food product.

By providing heaters in a dome-shaped ceiling, the ceiling itself generates both long and mid-range length wave radiation within the structure. The long wave radiation is used, as is well known, to cook the food product either in combination with steam, or after steam has raised the internal temperature of the food product to a predetermined level. In addition, mid-range wave length radiation generated by the dome ceiling can be used to superheat steam. The domed or multi-angled ceiling then has multiple functions. The dome shape focuses radiant heat waves and reflects heat onto the food located in one or more pans in the chamber. The dome also forces condensation to roll down the sloping ceiling and the walls, back into a reservoir in the base to help eliminate condensation from the ceiling dripping downwardly onto the food. The problem of condensation dripping onto the food is typical of steamers in the prior art. By minimizing condensation on the food dripping from the ceiling, heat transfer to the food is facilitated.

The steam within the chamber also tends to roll and billow downward from the domed ceiling causing re-circulation of heated air and more efficient cooking. While the heated dome ceiling can function to super heat the steam, steam will also be super heated in any event as it collects in the ceiling from generation in the base of the unit. Steam generated in the base then travels upwardly through and around the food product to be cooked and upon encountering the dome tends to billow downwardly to re-circulate until it condenses. If desired, after steaming the heated ceiling can be used to generate long wave radiation to brown the food product and thereby assist in cooking it. As will be obvious to those skilled in the art, if desired, the heated ceiling and/or sidewalls can be used with steam, or the heated ceiling and walls can be used as a sole source of heat for cooking.

Because the device of this invention is a pressure vessel, it is possible, in one embodiment, to incorporate a vacuum pump to draw down the pressure within the vessel. Food can then be marinated by soaking it or coating it with the appropriate marinade, then pressure conditions are reduced so that when pressure is restored the sauce will be rapidly absorbed by the food product. The unit of this invention is susceptible, in this embodiment, to automatic operation whereby meat or other food product can be marinated and then cooked without the intervention of an operator from the time the meat is loaded into the unit until the cooked product is removed.

The cooker of this invention also can be used with steam generated at a reduced pressure so that the food product can slow cook at a temperature below 212° F. if that is desired. This can be combined with subsequent browning after the food has cooked Accordingly it is an object of this invention to provide a pressure vessel for cooking which utilizes selectively steam and long and mid wave radiation to cook a food product.

It is another object of this invention to provide a combination cooker which can provide a vacuum atmosphere for use either with steam cooking, or prior to steam cooking and which additionally provides long and mid wave radiation in a domed ceiling, as desired.

It is still another object of this invention to provide a multiple function cooking apparatus which uses a vessel of cast aluminum having circumferential and interlocking ribs for structural integrity wherein the walls of the vessel are maintained above the cooking temperature of the food so that steam generated therein will condense on the food rather than on the walls during cooking.

It is yet another object of this invention to provide a pressure vessel using a heat source disposed in the base of the vessel to generate steam therein and in the domed ceiling to assist in cooking wherein long wave radiants generated by in the domed ceiling penetrate the steam and cook the food, and mid wave radiation generated therein serve to super heat the steam for hotter temperatures and faster cooking.

These and other objects will become readily apparent with reference to the drawings and following description wherein:

DETAILED DESCRIPTION OF THE INVENTION

Figure 1:
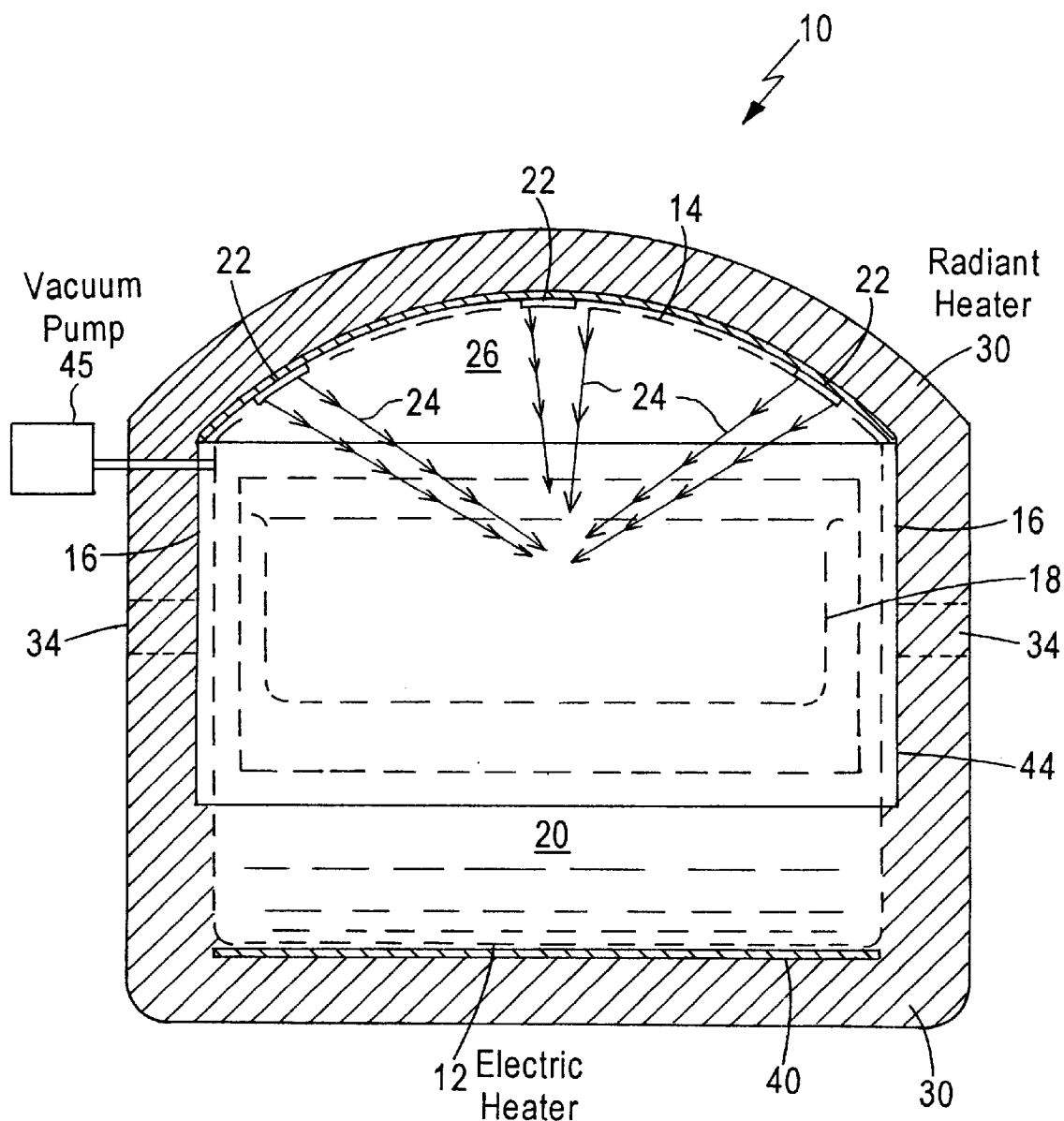
FIG. 1 is a schematic front view of a preferred embodiment of cooking chamber of this invention.

FIGS. 1–3A–3C show the pressure vessel of this invention 10 which consists of a base 12, a domed ceiling 14, and side walls 16. A cooking pan 18 is shown, but as will be obvious to those skilled in the art multiple cooking pans can be stacked within the vessel 10. The ceiling 14 is shown as a dome, but sloped portion 15 leading to sides 16 is most important and the upper most ceiling portion could be multi-angled rather than radially curved.

Steam is generated in the base 12 around the cooking pan 18 and rises into the ceiling 14. Radiant heaters 22 are provided external of the ceiling 14 to heat the ceiling so that it provides both long and mid wave radiation within the vessel 10. The long wave radiation shown schematically at 24 will penetrate steam in the dome portion 26 and cook the food in the tray 18. Mid-range radiation will super heat the steam and increase the temperature within the oven cavity.

With attention to FIGS. 2 and 3A–C, the vessel of this invention 10 has a series of circumferential flanges 30 and ribs 32 which extend outwardly from the ceiling 14 and the base 12 portions. A parting line 34 is provided joining the upper portion 14 with the lower portion 12 by a weld joint 35 shown in FIG. 2. Typically the entire unit is constructed of cast aluminum and, as will be obvious to those skilled in the art, the unit of this invention must be capable of withstanding pressure and vacuum, as well as being heat conductive. A preferred embodiment can have etched foil in the form of a heating source (not shown) and/or other heat retaining insulation between the flanges 30 in upper portion 14.

In another embodiment of this invention (not shown) a central portion can be welded between base 12 and upper portion 14 if it is desired to increase the capacity of unit 10.

In operation, according to one embodiment of this invention, heating elements 40 attached to the base 12, heat the base to generate steam in area 20 below the cooking pan 18. Steam generated from area 20 then travels upwardly through the chamber and billows around the food located in tray 18 to cook the same. Heat travels by conduction through the base 12 and side walls 16 and domed ceiling 14 so that in the preferred embodiment of this invention the walls of the unit 10 are heated above the cooking temperature of the food product to be cooked in the container 18. In this way the steam generated in area 20 will condense on the food product rather than on the interior of the cooking unit 10. As noted previously, condensation also could not drip from the ceiling onto the food during the cooking process. Condensation dripping on the food would interfere with the heat transfer from the steam. Therefore the design of the unit 10 and specifically the ceiling with shaped sides 15 and internal heating radiants 22 facilitates a more efficient cooking operation.

In the schematic representing FIG. 1, food then can be placed in a marinade liquid in tray 18 and a vacuum pump 45 used to evacuate vessel 10. When pressure is restored within the vessel the marinade liquid will be rapidly absorbed by the food to be cooked. As will be subsequently described, an operator can place the food in marinade liquid within vessel 10, marinade the food and then cook it without further operator intervention until the cooking process is completed.

Figure 2:
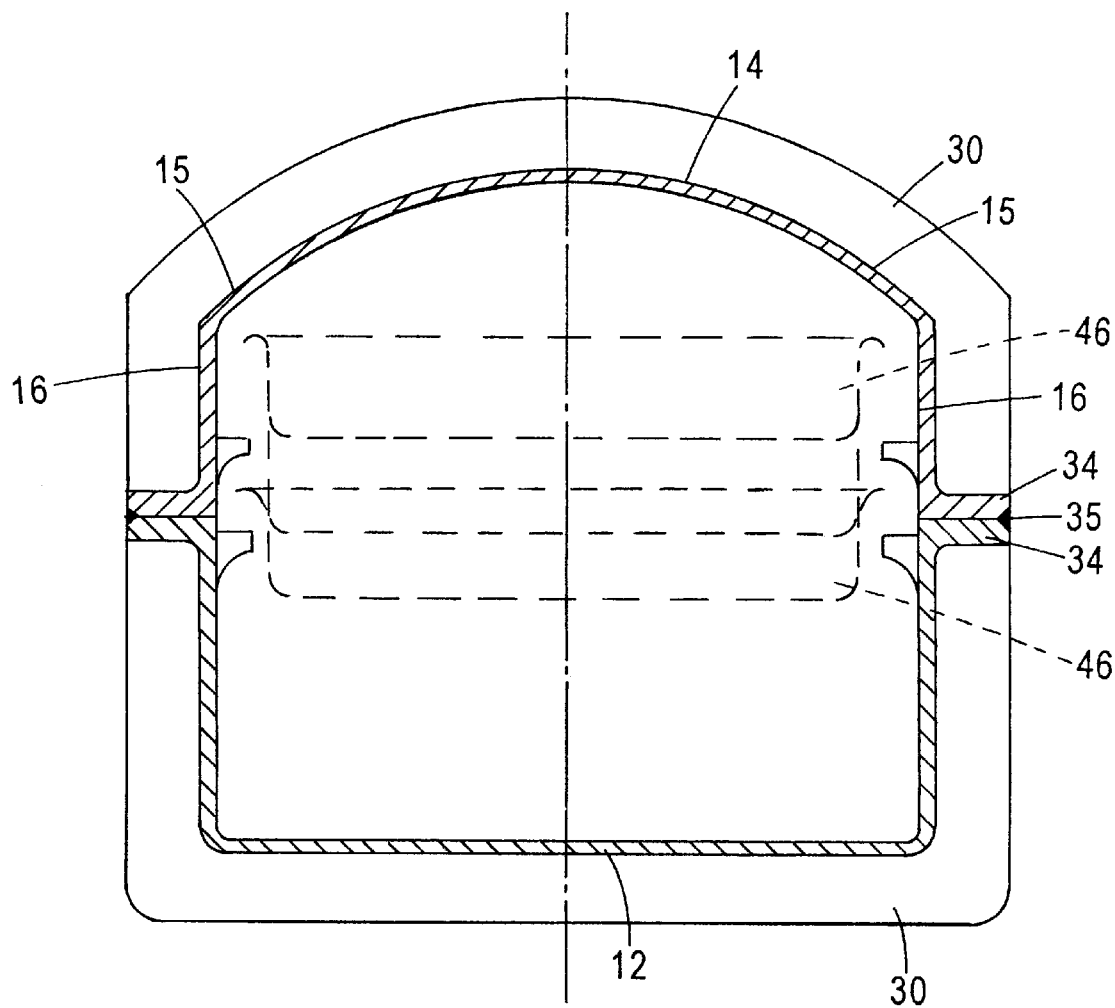
FIG. 2 is a front view of the embodiment of FIG. 1.
Figure 3A:
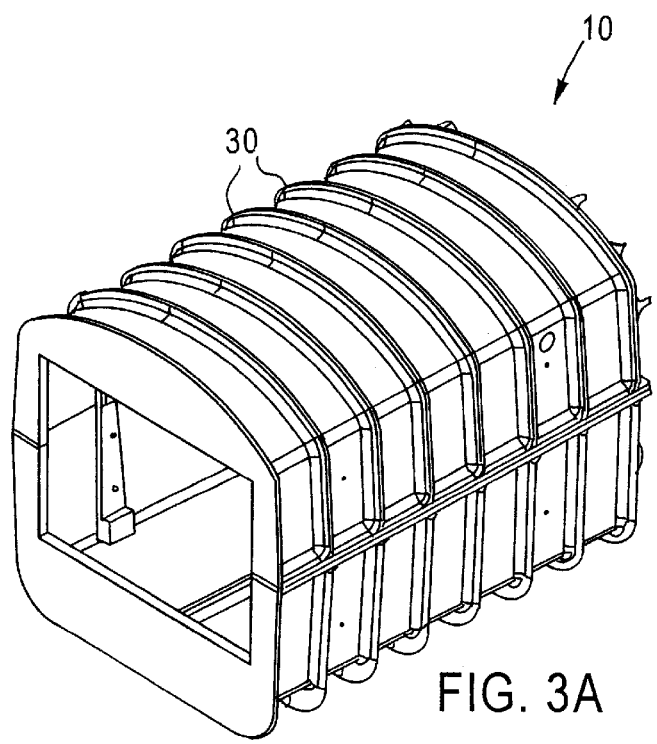
FIG. 3A is a front perspective view of the cooking chamber of FIGS. 1.
Figure 3B:
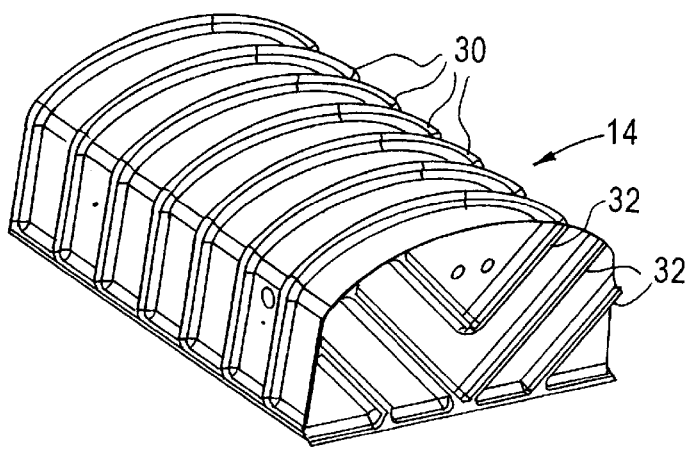
FIG. 3B is a rear perspective view of the top half of the chamber of FIG. 1.
Figure 3C:
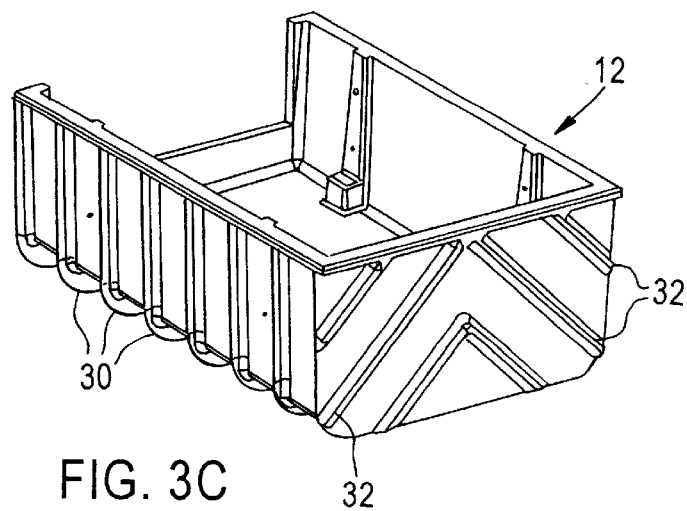
FIG. 3C is a rear perspective view of the bottom half of the chamber of FIG. 1.

FIGS. 1 and 2 show the pressure vessel 10 with a single tray 18, in FIG. 1, and plurality of trays 46 in FIG. 2. As will be obvious to those skilled in the art, multiple rays of food can be used within vessel 10, or as noted above capacity can be increased by a cast insert provided between the base 12 and the ceiling 14 at the parting line 35 so that three, five or seven trays, for example, can be used simultaneously.

As noted above the device of this invention can be operated at an elevated pressure and alternatively under a vacuum. The preferred operating parameters of the pressure vessel would be from 6 inches of mercury vacuum to 5 p.s.i.g. or 19.7 p.s.i.a. This pressure range would be adequate for most cooking needs. In fact, it is possible to cook with steam at less than atmospheric pressure at, for example, 5 p.s.i.a. at 161° F. to atmospheric pressure or 14.7 p.s.i.a. at 212° F. to pressurize the steam at 19.7 p.s.i.a. and 227° F. or combinations within these ranges.

The vessel of this invention then can function as a cooking apparatus to perform the following:

(A) Cooking with atmospheric steam.
(B) Cooking with steam under pressure.
(C) Cooking with a combination of atmospheric and pressurized steam in a timed or programmed combination.
(D) Cooking with radiant heat.
(E) Cooking with radiant heat combined with atmospheric or pressurized steam or both in a manual or programmed combination.
(F) Marination of the food to be cooked using a vacuum followed by programmed cooking.
(G) Marination and/or cooking followed by a holding programmed cycle.
(H) Cooking in a vacuum using sub-atmospheric steam and radiant heat; and
(I) Marination following by sub-atmospheric steaming followed by any of the above cooking combinations.

When cooking with a vacuum, steam will be generated below 212° F. and radiant heat can be used to assist in speed the cooking process. This result in less shrinkage and more moisture retained in the food as it is browned and caramelized by the radiant heat. This would also result in use of less water to generate steam so that the product being cooked retains more of its natural moisture. Radiant heat contacting the food cooks the food as to be expected and reduces condensation on the surface of the food as the steam cooks the food. The condensation can act as an insulator to reduce the heat transfer between the condensing steam and the food and by combing radiant heat therewith, the steam will cook more efficiently using less energy and less water to produce a slow cooked food product.

Figure 4:
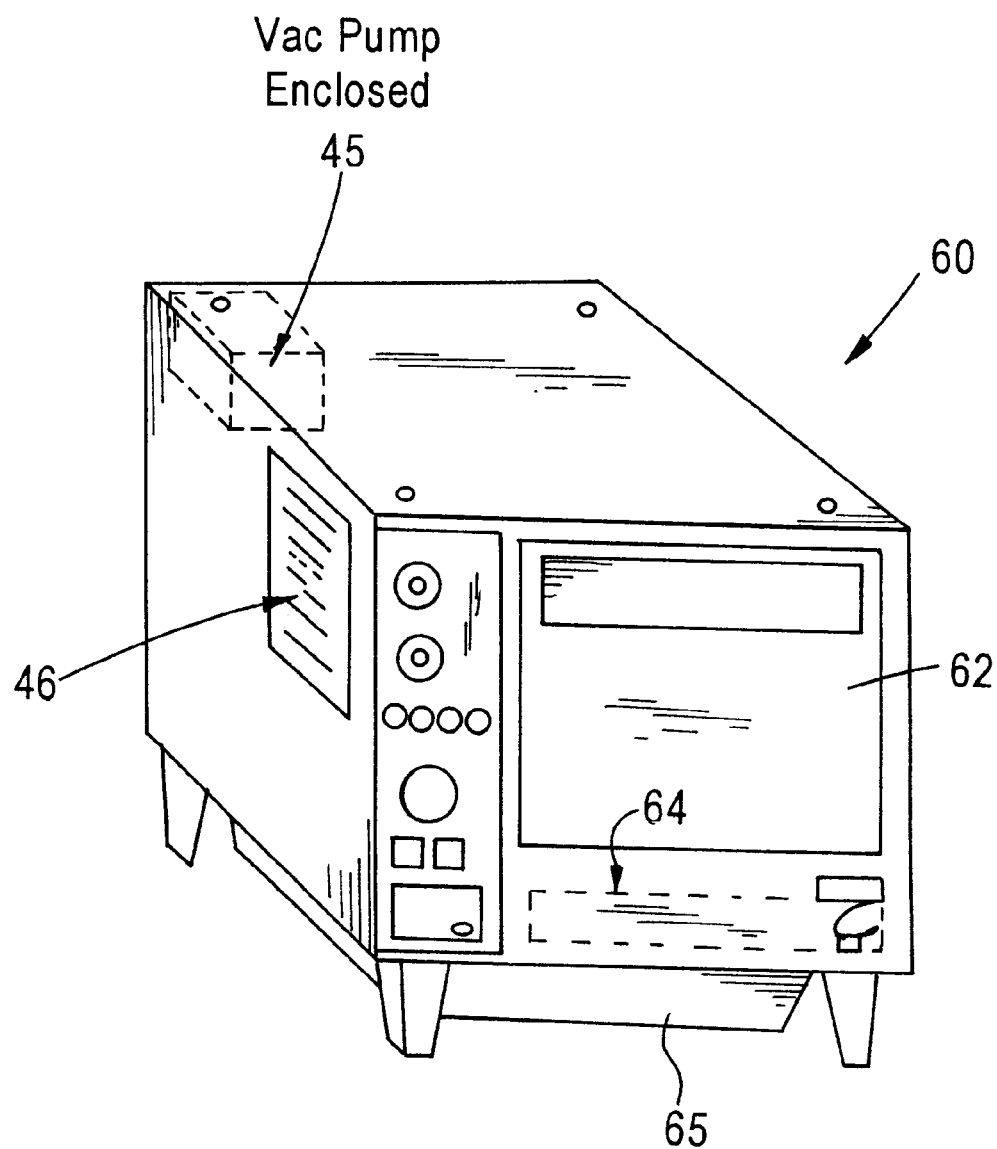
FIG. 4 is a perspective view of a cooker design for an enclosure surrounding the vessel of FIG. 1.

With attention to FIG. 4, the vessel 10 of this invention can be enclosed in a housing 60 using a door 62 in the front, and the housing 60 can be designed to be stackable as desired in a commercial environment. As shown, the vacuum pump 45 is provided in the side thereof, and a vent 46 is also provided. A reservoir 64 is provided in the base, and an exterior drain pan 65 is also provided.

Figure 5:
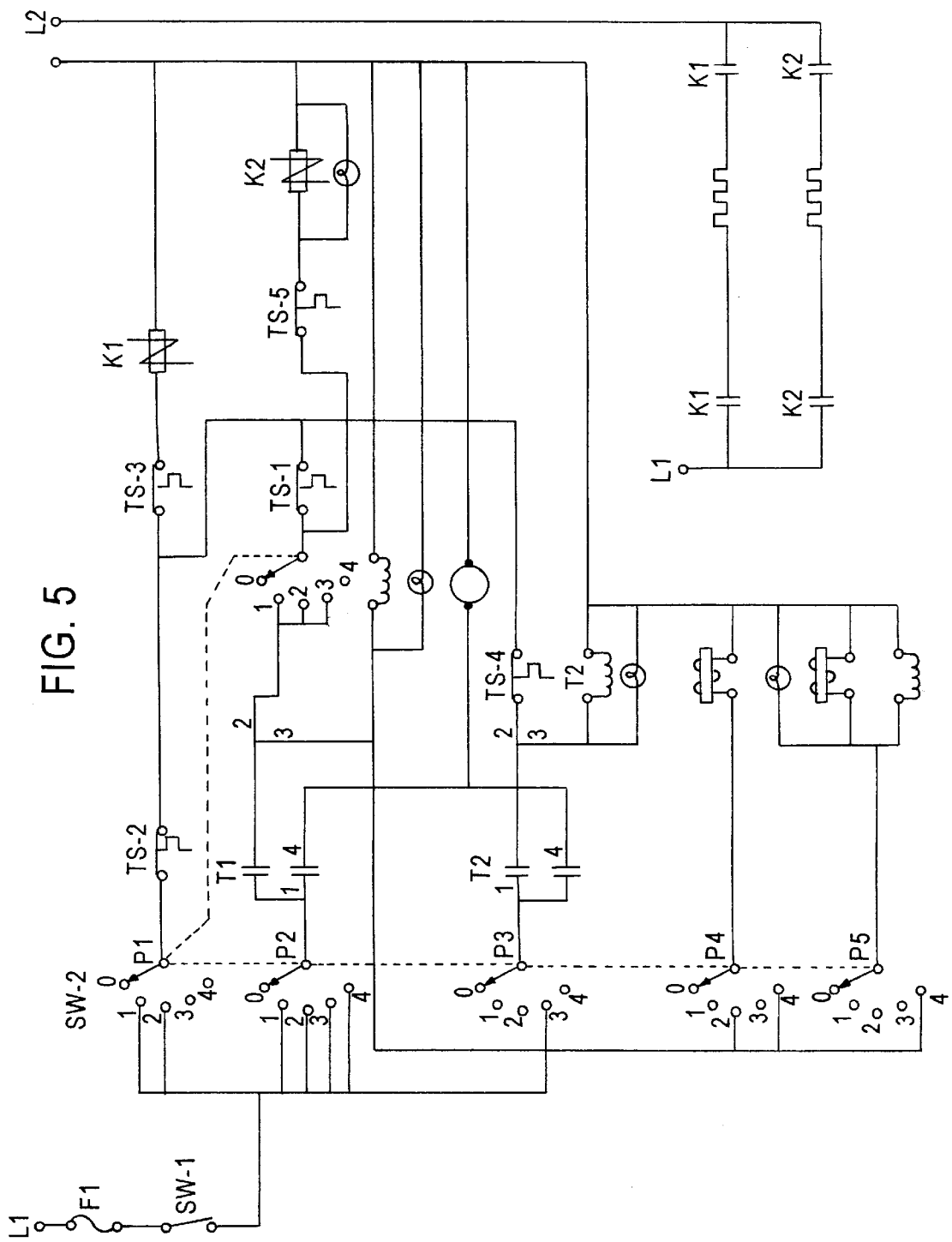
FIG. 5 is a typical circuit diagram for one embodiment of the multi-functional cooker of this invention.

With reference to FIG. 5, there is shown a typical circuit diagram for the electronic controls for the device of this invention. This is intended only as a example and not to be limitative of the instant invention. Furthermore, as will obvious to those skilled in the art, the controls can be automated by using a central processing unit (not shown). Typically, controls will be provided for the bottom and top heating elements which are respectively at the base 12 and the ceiling 14 of the vessel 10. In addition, the controls for the vacuum pump 45 are provided, a timer as shown is provided and other controls typical of this type of device will be obvious to those skilled in the art.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

What is claimed is:

1. A steam cooker comprising:

a conductive metal pressure vessel having sides, a bottom and a ceiling defining a cooking chamber, said ceiling having sloping interior sides; removable tray means disposed within said chamber spaced a predetermined distance below the ceiling for holding food to be cooked; said ceiling including radiant heat means for generating long wave and mid wave radiation within said chamber, the predetermined distance from said ceiling being sufficient so that said long wave radiation will penetrate food to be cooked when said food is disposed within said tray means, steam reservoir means disposed at the bottom of said vessel below said tray means;

conductive heat means coupled to said vessel external to said chamber for generating super heated steam from said reservoir means and for producing radiant heat from only the ceiling of said vessel by heating the ceiling and sides of said vessel by conduction to a temperature above the cooking temperature of the food to be cooked when said food is disposed in said tray means so that steam generated will not condense on the ceiling and sides of the vessel but will condense on the food to be cooked; and control means for selectively maintaining the interior of said vessel at a predetermined temperature and pressure for a predetermined period of time and for controlling the generation of steam therewithin.

2. The vessel of claim 1 wherein said, bottom and said ceiling are constructed of a member of the group consisting of anodized, non-anodized and coated cast aluminum.

3. The vessel of claim 2 wherein a plurality of mutually spaced, integral circumferential ribs and interlocking ribs are provided on the exterior of said vessel.

4. The vessel of claim 3 further comprising vacuum means coupled to said vessel for evacuating the interior thereof.

5. The vessel of claim 1 further comprising sealing means for sealing the interior at least from about a negative pressure of 6 mmHg to a positive pressure of about 19.7 p.s.i.a.

6. The vessel of claim 5 comprising a cast upper half and a cast lower half joined by a sealing weld surrounding the circumference thereof.

7. The vessel of claim 1 wherein said vessel ceiling is a dome.

8. The cooker of claim 1 wherein said conductive heat means includes resistance heaters coupled to the bottom of said vessel.

9. The method of cooking comprising the steps of:

providing a pressure vessel having walls, a base containing a reservoir and a domed ceiling and heat means in said base for heating the walls, base, and ceiling by conduction and for generating long wave and mid wave radiation in the ceiling, maintaining food to be cooked in said vessel; and heating said vessel to generate steam in said reservoir while maintaining the walls thereof at a temperature higher than a predetermined level equal to the cooking temperature of said food and sufficiently high to cause condensation of the steam generated on the food to be cooked and not on the vessel walls while said food is cooked and to generate radiation only in the ceiling to cook said food and heat the steam.

10. The method of claim 7 further comprising maintaining the pressure within said vessel at a predetermined level for a predetermined period of time.

11. The method of claim 9 wherein said food is initially maintained in a marinade liquid at a pressure below atmospheric pressure and then cooked at a pressure above or below atmospheric pressure.

* * * * *